United States Patent
Belady et al.

(10) Patent No.: US 10,748,224 B2
(45) Date of Patent: Aug. 18, 2020

(54) CONTINUOUSLY GROWING PHYSICAL STRUCTURE

(71) Applicant: Microsoft Technology Licensing, LLC, Redmond, WA (US)

(72) Inventors: Christian L. Belady, Mercer Island, WA (US); Sean Michael James, Olympia, WA (US); Michael Rees Helsel, Seattle, WA (US); Nicholas Andrew Keehn, Kirkland, WA (US); Eric C. Peterson, Woodinville, WA (US)

(73) Assignee: MICROSOFT TECHNOLOGY LICENSING, LLC, Redmond, WA (US)

( * ) Notice: Subject to any disclaimer, the term of this patent is extended or adjusted under 35 U.S.C. 154(b) by 151 days.

(21) Appl. No.: 15/591,866

(22) Filed: May 10, 2017

(65) Prior Publication Data
US 2018/0330454 A1    Nov. 15, 2018

(51) Int. Cl.
*G06Q 50/16*    (2012.01)
*G06Q 10/06*    (2012.01)
*G06Q 50/08*    (2012.01)
*B28B 1/00*    (2006.01)

(52) U.S. Cl.
CPC ............ *G06Q 50/16* (2013.01); *B28B 1/001* (2013.01); *G06Q 10/06313* (2013.01); *G06Q 50/08* (2013.01)

(58) Field of Classification Search
CPC .. G06Q 50/16; G06Q 50/08; G06Q 10/06313; G01M 99/00; B28B 1/001
See application file for complete search history.

(56) References Cited

U.S. PATENT DOCUMENTS

| | | | |
|---|---|---|---|
| 7,725,212 B2 | 5/2010 | Prasse | |
| 9,962,855 B2 * | 5/2018 | Campbell | B33Y 10/00 |
| 2002/0100228 A1 * | 8/2002 | Yoder | E04G 11/22 |
| | | | 52/80.1 |
| 2015/0232273 A1 | 8/2015 | Jau et al. | |

(Continued)

OTHER PUBLICATIONS

Mansley, et al., "Robotic Mapping and Monitoring of Data Centers", In Proceedings of IEEE International Conference on Robotics and Automation, May 9, 2011, 6 pages.

(Continued)

*Primary Examiner* — Catherine T. Rastovski
(74) *Attorney, Agent, or Firm* — Workman Nydegger (57) ABSTRACT

A continuously growing physical structure may be generated by identifying a plurality of metrics associated with the physical structure. The plurality of metrics may include at least one of a shape of available physical space, a size of available physical space, a type of soil/earth of a location of the physical structure, a context of use of the physical structure, a climate of the location, or availability of resources associated with the location. The plurality of metrics may be analyzed to determine at least one of a rate of growth of the physical structure or a most suitable shape of the physical structure. Growth of the physical structure may then be generated according to at least one of the determined rate of growth of the physical structure or the determined most suitable shape of the physical structure. The identified plurality of metrics may then be monitored periodically.

19 Claims, 4 Drawing Sheets

400

410
Identifying A Plurality Of Metrics Associated With The Physical Structure

420
Analyzing The Plurality Of Metrics To Determine Both A Rate Of Growth Of The Physical Structure And A Most Suitable Shape Of The Physical Structure 430
Generating Growth Of The Physical Structure According To The Determined Rate Of Growth Of The Physical Structure And The Determined Most Suitable Shape Of The Physical Structure 440
Monitoring The Identified Plurality Of Metrics Periodically (56) References Cited

U.S. PATENT DOCUMENTS

| | | | |
|---|---|---|---|
| 2015/0239178 A1* | 8/2015 | Armstrong | B29C 64/393 |
| | | | 700/98 |
| 2016/0107312 A1 | 4/2016 | Morrill et al. | |
| 2016/0135318 A1* | 5/2016 | Dean | G11C 5/142 |
| | | | 361/679.33 |
| 2018/0218304 A1* | 8/2018 | Shike | G06Q 50/08 |

OTHER PUBLICATIONS

Lenchner, et al., "Towards Data Center Self-Diagnosis Using a Mobile Robot", http://www.research.ibm.com/people/l/lenchner/docs/icac2011_proofed.pdf, Published on: Jun. 14, 2011, 10 pages.

Kleyman, Bill, "The Role of Robotics in Data Center Automation", http://www.datacenterknowledge.com/archives/2013/12/18/role-robotics-data-center-automation/, Published on: Dec. 18, 2013, 6 pages.

Kassner, Michael, "Is it time to get humans out of data centers?", http://www.techrepublic.com/article/is-it-time-to-get-humans-out-of-data-centers/, Published on: Jul. 7, 2014, 5 pages.

Moss, Sebastian, "Startup proposes robotic data centers with no humans", http://www.datacenterdynamics.com/content-tracks/design-build/startup-proposes-robotic-data-centers-with-no-humans/96657.fullarticle, Published on: Jul. 26, 2016, 1 pages.

Vivek, Srinivasa, "How a Robot Can Simplify Data Center Management", http://www.datacenterknowledge.com/archives/2013/08/26/how-a-robot-can-simplify-data-center-management/, Published on: Aug. 26, 2013, 5 pages.

Russo, et al., "A Novel Cloud-Based Service Robotics Application to Data Center Environmental Monitoring", In Journal of Sensors, vol. 16, Issue 8, Aug. 8, 2016, pp. 1-18.

\* cited by examiner

CONTINUOUSLY GROWING PHYSICAL STRUCTURE

BACKGROUND

Computer systems and related technology affect many aspects of society. Indeed, the computer system's ability to process information has transformed the way we live and work. Computer systems now commonly perform a host of tasks (e.g., word processing, scheduling, accounting, etc.) that prior to the advent of the computer system were performed manually. More recently, computer systems have been coupled to one another and to other electronic devices to form both wired and wireless computer networks over which the computer systems and other electronic devices can transfer electronic data. As such, the performance of many computing tasks has become distributed across a number of different computer systems and/or a number of different computer environments.

For instance, there has been an increasing transition, with respect to both hardware and software, from on-premises to cloud based solutions. Enormous amounts of data relating to such cloud-based solutions are generated, transferred, and shared each minute of each day. As such, the amount of data, and need for data centers that are capable of adequately processing data, storing data, and so forth, continues to grow each day. Oftentimes such data centers use resources, power delivery options, and so forth, that are not easily accessible from a site of a given data center. Additionally, a host of human interactions with a given data center may comprise inefficiencies in the operation of the given data center.

The subject matter claimed herein is not limited to embodiments that solve any disadvantages or that operate only in environments such as those described above. Rather, this background is only provided to illustrate one exemplary technology area where some embodiments described herein may be practiced.

BRIEF SUMMARY

At least some embodiments described herein relate to generating a continuously growing physical structure. For example, embodiments may include identifying a plurality of metrics associated with the physical structure. The plurality of metrics may include at least one of a shape of available physical space, a size of available physical space, a type of soil/earth of a location of the physical structure, a context of use of the physical structure, a climate of the location, or availability of resources associated with the location. Embodiments may further include analyzing the plurality of metrics to determine at least one of a rate of growth of the physical structure, or a most suitable shape of the physical structure. Embodiments may also include generating growth of the physical structure according to at least one of the determined rate of growth of the physical structure or the determined most suitable shape of the physical structure. Embodiments may also include monitoring the identified plurality of metrics periodically.

In this way, a continuously growing physical structure (e.g., a data center) may be generated that is similar to a living organism. Analysis of the physical structure and various metrics associated with the structure (e.g., size and shape of available land, a context for use of the physical structure, and so forth) may allow for optimized, efficient use of space (i.e., via the determined shape of the physical structure), optimized use of resources (i.e., via the materials determined to be used in creating the physical structure), automatically generated growth of the physical structure at an optimal growth rate, repair/replacement of components when appropriate, and so forth. As such, human interaction at the site may be largely avoided with respect to any aspect of growth of the physical structure, repair/replacement of components of the physical structure, or disposal of components, as growth, repair/replacement, and disposal may be handled automatically.

This summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

BRIEF DESCRIPTION OF THE DRAWINGS

In order to describe the manner in which the above-recited and other advantages and features of the invention can be obtained, a more particular description of the invention briefly described above will be rendered by reference to specific embodiments thereof which are illustrated in the appended drawings. Understanding that these drawings depict only typical embodiments of the invention and are not therefore to be considered to be limiting of its scope, the invention will be described and explained with additional specificity and detail through the use of the accompanying drawings in which.

DETAILED DESCRIPTION

At least some embodiments described herein relate to generate a continuously growing physical structure. For example, embodiments may include identifying a plurality of metrics associated with the physical structure. The plurality of metrics may include at least one of a shape of available physical space, a size of available physical space, a type of soil/earth of a location of the physical structure, a context of use of the physical structure, a climate of the location, or availability of resources associated with the location. Embodiments may further include analyzing the plurality of metrics to determine at least one of a rate of growth of the physical structure, or a most suitable shape of the physical structure. Embodiments may also include generating growth of the physical structure according to at least one of the determined rate of growth of the physical structure or the determined most suitable shape of the physical structure. Embodiments may also include monitoring the identified plurality of metrics periodically.

In this way, a continuously growing physical structure (e.g., a data center) may be generated that is similar to a living organism. Analysis of the physical structure and various metrics associated with the structure (e.g., size and shape of available land, a context for use of the physical structure, and so forth) may allow for optimized, efficient use of space (i.e., via the determined shape of the physical structure), optimized use of resources (i.e., via the materials determined to be used in creating the physical structure), automatically generated growth of the physical structure at an optimal growth rate, repair/replacement of components when appropriate, and so forth. As such, human interaction at the site may be largely avoided with respect to any aspect of growth of the physical structure, repair/replacement of components of the physical structure, or disposal of components, as growth, repair/replacement, and disposal may be handled automatically.

Some introductory discussion of a computing system will be described with respect to FIG. 1. Then generating a continuously growing physical structure will be described with respect to FIGS. 2 through 4.

Computing systems are now increasingly taking a wide variety of forms. Computing systems may, for example, be handheld devices, appliances, laptop computers, desktop computers, mainframes, distributed computing systems, datacenters, or even devices that have not conventionally been considered a computing system, such as wearables (e.g., glasses). In this description and in the claims, the term "computing system" is defined broadly as including any device or system (or combination thereof) that includes at least one physical and tangible processor, and a physical and tangible memory capable of having thereon computer-executable instructions that may be executed by a processor. The memory may take any form and may depend on the nature and form of the computing system. A computing system may be distributed over a network environment and may include multiple constituent computing systems.

Figure 1:
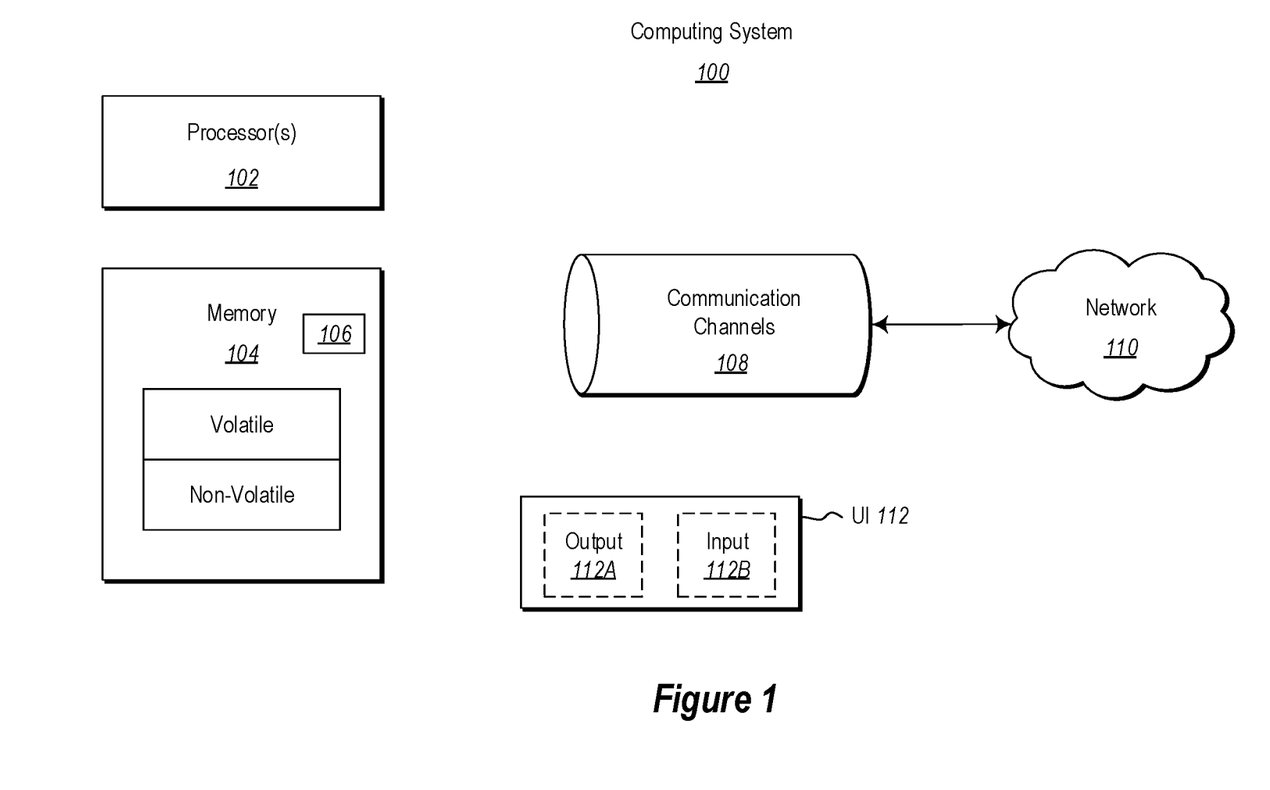
FIG. 1 illustrates an example computer architecture that facilitates operation of the principles described herein.

As illustrated in FIG. 1, in its most basic configuration, a computing system 100 typically includes at least one hardware processing unit 102 and memory 104. The memory 104 may be physical system memory, which may be volatile, non-volatile, or some combination of the two. The term "memory" may also be used herein to refer to non-volatile mass storage such as physical storage media. If the computing system is distributed, the processing, memory and/or storage capability may be distributed as well.

The computing system 100 also has thereon multiple structures often referred to as an "executable component". For instance, the memory 104 of the computing system 100 is illustrated as including executable component 106. The term "executable component" is the name for a structure that is well understood to one of ordinary skill in the art in the field of computing as being a structure that can be software, hardware, or a combination thereof. For instance, when implemented in software, one of ordinary skill in the art would understand that the structure of an executable component may include software objects, routines, methods, and so forth, that may be executed on the computing system, whether such an executable component exists in the heap of a computing system, or whether the executable component exists on computer-readable storage media.

In such a case, one of ordinary skill in the art will recognize that the structure of the executable component exists on a computer-readable medium such that, when interpreted by one or more processors of a computing system (e.g., by a processor thread), the computing system is caused to perform a function. Such structure may be computer-readable directly by the processors (as is the case if the executable component were binary). Alternatively, the structure may be structured to be interpretable and/or compiled (whether in a single stage or in multiple stages) so as to generate such binary that is directly interpretable by the processors. Such an understanding of example structures of an executable component is well within the understanding of one of ordinary skill in the art of computing when using the term "executable component".

The term "executable component" is also well understood by one of ordinary skill as including structures that are implemented exclusively or near-exclusively in hardware, such as within a field programmable gate array (FPGA), an application specific integrated circuit (ASIC), or any other specialized circuit. Accordingly, the term "executable component" is a term for a structure that is well understood by those of ordinary skill in the art of computing, whether implemented in software, hardware, or a combination. In this description, the terms "component", "service", "engine", "module", "control", or the like may also be used. As used in this description and in the case, these terms (whether expressed with or without a modifying clause) are also intended to be synonymous with the term "executable component", and thus also have a structure that is well understood by those of ordinary skill in the art of computing.

In the description that follows, embodiments are described with reference to acts that are performed by one or more computing systems. If such acts are implemented in software, one or more processors (of the associated computing system that performs the act) direct the operation of the computing system in response to having executed computer-executable instructions that constitute an executable component. For example, such computer-executable instructions may be embodied on one or more computer-readable media that form a computer program product. An example of such an operation involves the manipulation of data.

The computer-executable instructions (and the manipulated data) may be stored in the memory 104 of the computing system 100. Computing system 100 may also contain communication channels 108 that allow the computing system 100 to communicate with other computing systems over, for example, network 110.

While not all computing systems require a user interface, in some embodiments, the computing system 100 includes a user interface 112 for use in interfacing with a user. The user interface 112 may include output mechanisms 112A as well as input mechanisms 112B. The principles described herein are not limited to the precise output mechanisms 112A or input mechanisms 112B as such will depend on the nature of the device. However, output mechanisms 112A might include, for instance, speakers, displays, tactile output, holograms and so forth. Examples of input mechanisms 112B might include, for instance, microphones, touchscreens, holograms, cameras, keyboards, mouse of other pointer input, sensors of any type, and so forth.

Embodiments described herein may comprise or utilize a special purpose or general-purpose computing system including computer hardware, such as, for example, one or more processors and system memory, as discussed in greater detail below. Embodiments described herein also include physical and other computer-readable media for carrying or storing computer-executable instructions and/or data structures. Such computer-readable media can be any available media that can be accessed by a general purpose or special purpose computing system. Computer-readable media that store computer-executable instructions are physical storage media. Computer-readable media that carry computer-executable instructions are transmission media. Thus, by way of example, and not limitation, embodiments of the invention can comprise at least two distinctly different kinds of computer-readable media: storage media and transmission media.

Computer-readable storage media includes RAM, ROM, EEPROM, CD-ROM or other optical disk storage, magnetic disk storage or other magnetic storage devices, or any other physical and tangible storage medium which can be used to store desired program code means in the form of computer-executable instructions or data structures and which can be accessed by a general purpose or special purpose computing system.

A "network" is defined as one or more data links that enable the transport of electronic data between computing systems and/or modules and/or other electronic devices. When information is transferred or provided over a network or another communications connection (either hardwired, wireless, or a combination of hardwired or wireless) to a computing system, the computing system properly views the connection as a transmission medium. Transmissions media can include a network and/or data links which can be used to carry desired program code means in the form of computer-executable instructions or data structures and which can be accessed by a general purpose or special purpose computing system. Combinations of the above should also be included within the scope of computer-readable media.

Further, upon reaching various computing system components, program code means in the form of computer-executable instructions or data structures can be transferred automatically from transmission media to storage media (or vice versa). For example, computer-executable instructions or data structures received over a network or data link can be buffered in RAM within a network interface module (e.g., a "NIC"), and then eventually transferred to computing system RAM and/or to less volatile storage media at a computing system. Thus, it should be understood that storage media can be included in computing system components that also (or even primarily) utilize transmission media.

Computer-executable instructions comprise, for example, instructions and data which, when executed at a processor, cause a general purpose computing system, special purpose computing system, or special purpose processing device to perform a certain function or group of functions. Alternatively, or in addition, the computer-executable instructions may configure the computing system to perform a certain function or group of functions. The computer executable instructions may be, for example, binaries or even instructions that undergo some translation (such as compilation) before direct execution by the processors, such as intermediate format instructions such as assembly language, or even source code.

Although the subject matter has been described in language specific to structural features and/or methodological acts, it is to be understood that the subject matter defined in the appended claims is not necessarily limited to the described features or acts described above. Rather, the described features and acts are disclosed as example forms of implementing the claims.

Those skilled in the art will appreciate that the invention may be practiced in network computing environments with many types of computing system configurations, including, personal computers, desktop computers, laptop computers, message processors, hand-held devices, multi-processor systems, microprocessor-based or programmable consumer electronics, network PCs, minicomputers, mainframe computers, mobile telephones, PDAs, pagers, routers, switches, datacenters, wearables (such as glasses) and the like. The invention may also be practiced in distributed system environments where local and remote computing systems, which are linked (either by hardwired data links, wireless data links, or by a combination of hardwired and wireless data links) through a network, both perform tasks. In a distributed system environment, program modules may be located in both local and remote memory storage devices.

Those skilled in the art will also appreciate that the invention may be practiced in a cloud computing environment. Cloud computing environments may be distributed, although this is not required. When distributed, cloud computing environments may be distributed internationally within an organization and/or have components possessed across multiple organizations. In this description and the following claims, "cloud computing" is defined as a model for enabling on-demand network access to a shared pool of configurable computing resources (e.g., networks, servers, storage, applications, and services). The definition of "cloud computing" is not limited to any of the other numerous advantages that can be obtained from such a model when properly deployed.

Figure 2:
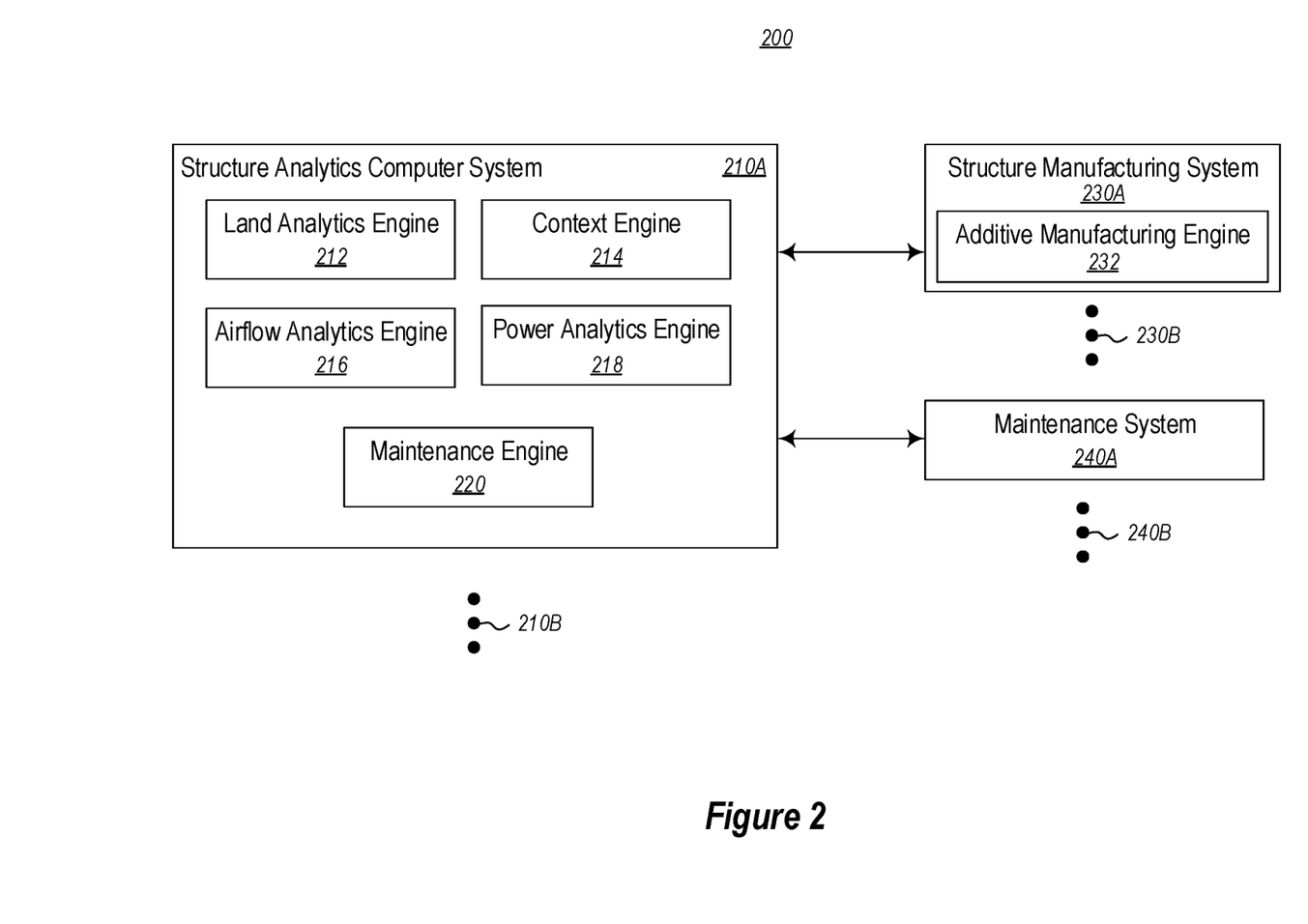
FIG. 2 illustrates an example environment for generating a continuously growing physical structure.

FIG. 2 illustrates a computer environment 200 for generating a continuously growing physical structure. Notably, such a physical structure may comprise any of a number of different types of physical structures. For instance, the physical structure may comprise a data center, a commercial building (e.g., an office building), a residential building (e.g., an apartment complex, a condominium complex, a house, and so forth), a warehouse, a storage complex, and so forth. While particular types of physical structures are enumerated herein, such structures are discussed only for example purposes, as the principles described herein may be practiced with respect to essentially limitless types of physical structures.

As illustrated, the computer environment 200 includes a structure analytics computer system 210A, a structure manufacturing system 230A, and a maintenance system 240A. Each of the structure analytics computer system 210A, the structure manufacturing system 230A, and the maintenance system 240A may correspond to the computer system 100, as described with respect to FIG. 1. Furthermore, while only one structure analytics computer system 210A, one structure manufacturing system 230A, and one maintenance system 240A are illustrated, ellipses 210A, ellipses 230A, and ellipses 240A represent that there may be any number of structure analytics computer systems, structure manufacturing systems, and maintenance systems, respectively. Accordingly, a location, or site, of a particular physical structure to be built may include one or more structure analytics computer systems, one or more structure manufacturing systems, and one or more maintenance systems. Notably, in some embodiments, the structure analytics computer system may be a distributed computer system that is either partially on-site or completely off-site.

As illustrated in FIG. 2, the structure analytics computer system 210A includes various engines and/or functional blocks that may be used to generate a continuously growing physical structure, as further described herein. The various engines and/or functional blocks of the structure analytics computer system 210A may be implemented on a local computer system or may be implemented on a distributed computer system that includes elements resident in the cloud or that implement aspects of cloud computing. The various engines and/or functional blocks of the structure analytics computer system 210A may be implemented as software, hardware, or a combination of software and hardware.

Notably, the structure analytics computer system 210A may include more or less than the engines illustrated in FIG. 2. Additionally, some of the engines may be combined as circumstances warrant. For instance, airflow analytics engine 216 and power analytics engine 218 may be combined into a single engine that performs the functions of both engines. In another example, land analytics engine 212 may be separated into multiple engines that collectively perform the functions of the land analytics engine. Although not illustrated, the various engines of the structure analytics computer system 210A may access and/or utilize a processor and memory, such as the processor 102 and the memory 104 of FIG. 1, as needed to perform their various functions.

As illustrated in FIG. 2, the structure analytics computer system 210 may include a land analytics engine 212. The land analytics engine may be configured to perform a number of operations related to a location, or site, where a physical structure is to be built. For instance, the land analytics engine may be capable of identifying a number of metrics associated with the site. Such metrics may include an amount of space available for creating a physical structure (e.g., a data center), a shape of available space (e.g., width, length, height, and so forth of available space to build the physical structure), a type of soil/material of the location, a climate of the location, availability of resources associated with the location, and so forth.

In an example, the land analytics engine may be able to determine that a particular location has a warm, dry, and windy climate. Such a determination may include average temperatures (e.g., during particular times of year, during particular parts of a day, and so forth), minimum temperatures, maximum temperatures, average wind, minimum winds, maximum winds, average moisture (e.g., snow, rain, and so forth), maximum moisture, minimum moisture, and so forth. In another example, the land analytics engine may determine that the site comprises 1,000 acres of open land that forms roughly a square shape. In such an example, the land analytics engine may further define an exact boundary of the site. Notably, while particular examples are used herein, the examples are used for exemplary purposes only, and are not meant to limit the principles described herein. Accordingly, the land analytics engine may be configured to identify any number of metrics associated with a site on which a physical structure is to be built.

The structure analytics computer system 210A may also include a context engine 214. The context engine 214 may be capable of determining a context in which the physical structure is to be used. For instance, the physical structure may be used as a data center, as a commercial office building, a residential building, and so forth. Even more particularly, in the event that the physical structure is to be used as a data center, the data center may comprise a particular type of data center. For instance, the data center may be used for one or more of cold storage, high-performance servers, general purpose servers, graphics processing unit (GPU) servers, and so forth.

In some embodiments, the context engine may further be configured to determine the most likely future uses of the physical structure. For example, while the physical structure may currently be used for cold storage, perhaps the context engine has determined that the physical structure is more likely to largely utilize GPU servers in the near future. Such determinations by the context engine may be at least partially made based on business models of an entity that owns the physical structure to be built (or that has already been built and is currently growing).

For instance, projections may show that while cold storage is currently very profitable, GPU servers are likely to become more profitable in the near future. The context data engine may also use business models to aid in determining a rate of growth of the physical structure. For instance, when a business model associated with an entity that owns the physical structure shows rapid growth of the entity, the rate of growth may be increased. Alternatively, when such a business model associated with the entity shows slowed growth (or even decay), the rate of growth may be decreased. As such, a rate of the growth of the physical structure may not be fixed. Accordingly, the context engine may aid in determining current optimal uses associated with a physical structure to be built (or that has already been built and is currently growing, as described herein), as well as current optimal rates of the growth of the physical structure.

The structure analytics computer system may be capable of analyzing metrics/data identified by the land analytics engine 212 and the context engine 214 to determine optimal characteristics of the physical structure (e.g., a data center). For instance, the structure analytics computer system may analyze metrics/data provided by the land analytics engine (e.g., climate of the site, size of the site, and so forth) and the context engine (e.g., what the physical structure is most likely to be used for currently and in the near future) to determine a plurality of characteristics of the physical structure, including but not limited to, an optimal initial size of the physical structure, an optimal initial growth rate of the physical structure, an optimal initial position on the site (i.e., the location in which land is available to build the physical structure) to begin creating the physical structure, an optimal shape for the physical structure, optimal materials to be used in the creation of the physical structure, and so forth.

Furthermore, as shown, the structure analytics computer system can also include an airflow analytics engine 216 to aid in the determination of characteristics of the physical structure. For instance, the airflow analytics engine 216 may be configured to aid in determining an optimal shape (e.g., external portion) and layout (e.g., interior portion) of the physical structure for providing sufficient airflow (i.e., heating and cooling) to the physical structure (e.g., to any components within the physical structure).

In an example, the airflow analytics engine may determine that based on the climate of the site and the available space within the site (e.g., size and/or shape of the available land), a particular shape that allows some natural air leakage into the physical structure would create optimal air flow. In such an example, the airflow analytics engine may further determine that a particular layout having a plurality of plenum spaces within the physical structure may additionally be utilized to provide proper airflow. Accordingly, the airflow analytics engine 216 may analyze metrics/data provided by the land analytics engine and the context engine to determine an optimal shape (i.e., both inside and outside of the physical structure) for providing sufficient airflow to the physical structure.

Power analytics engine 218 may also be included in the structure analytics computer system to aid in the determination of characteristics of the physical structure. As such, the power analytics engine 218 may be configured to aid in determining an optimal shape (e.g., external portion) and layout (e.g., interior portion) of the physical structure for providing optimal power sources and network connections for the physical structure (e.g., to provide power to servers, fans, and so forth). For instance, the power analytics engine may determine that the optimal power delivery to the physical structure may include particular piping (e.g., natural gas, hydrogen, and so forth), wiring of particular materials (e.g., copper), particular types of batteries (e.g., flow batteries), solar panels, electrolytic fluids, powdered conductor (e.g., copper) built into walls of the physical structure, and so forth.

In another example, the power analytics engine may also determine optimal network connections include particular fiber optic cables, antennas, and so forth. In making such determinations (i.e., power delivery and network connections), the power analytics engine may also analyze metrics/ data provided by the land analytics engine and the context engine. For instance, the land analytics engine may determine that natural gas is prevalent in the vicinity of the location in which the physical structure is to be built, therefore causing the power analytics engine to determine that natural gas is to comprise at least part of the power delivery to the physical structure.

Accordingly, utilizing the land analytics engine, the context engine, the airflow analytics engine, and the power analytics engine, the structure analytics computer system may determine an optimal physical structure for the particular site/location. Such a determined physical structure may include numerous characteristics, including but not limited to, an optimal starting point within the site to build the physical structure, an optimal initial size of the physical structure, an optimal external shape of the physical structure, optimal resources to be used in the physical structure, an optimal rate of growth of the physical structure, an optimal internal layout of the physical structure, optimal airflow (based at least in part on one or both of the external shape and the internal shape of the physical structure), optimal power delivery, optimal network connections, and so forth.

Once the optimal physical structure (and characteristics associated with the physical structure) have been determined, the structure analytics computer system 210A may communicate with the structure manufacturing system 230 to perform the actual creation of the physical structure. As such, the structure manufacturing system may comprise any combination of equipment, machinery, computer systems, and so forth, that is capable of responding to instructions received from the structure analytics computer system by creating a physical structure that corresponds to the received instructions. As illustrated, the structure manufacturing system may also include an additive manufacturing engine 232 that is configured to add continual growth to the physical structure, such that the physical structure is continuously growing according to a rate of growth and an external/internal shape, as determined by the structure analytics computer system. In an example, the structure manufacturing system and/or the additive manufacturing engine may include one or more 3D printers that are capable of building large, continuously growing physical structures (e.g., buildings, warehouses, and so forth) out of various materials (e.g., concrete).

Additionally, various types of robots may be utilized in construction and maintenance of the physical structure (and may logically be included as part of the structure manufacturing system). In an example, robots that comprise at least a portion of the structure manufacturing system may position walls that have been printed by a 3D printer, place servers in proper locations, lay down electrical connections (e.g., wires, pipes, and so forth), create network connections (e.g., using fiber optic cables), and so forth. Accordingly, as discussed, while shown as being only one component, the structure manufacturing system may comprise numerous components (e.g., 3D printer, robots, and so forth) configured to create, and generate continuous growth of, a physical structure, as further described herein.

Figure 3A:
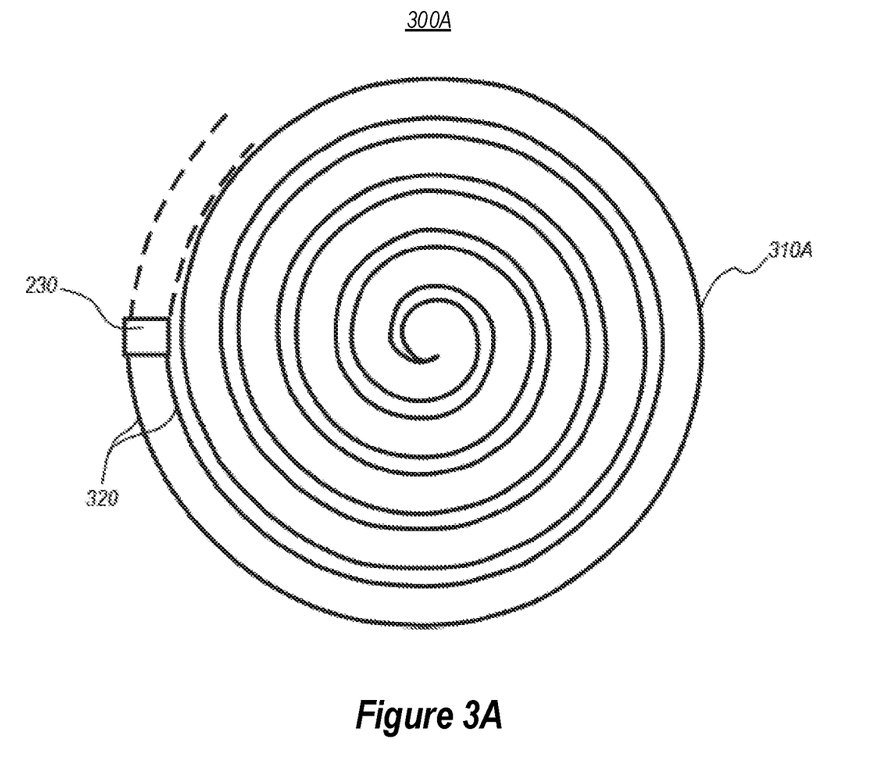
FIGS. 3A, 3B, and 3C illustrate exemplary shapes associated with a continuously growing physical structure.
Figure 3B:
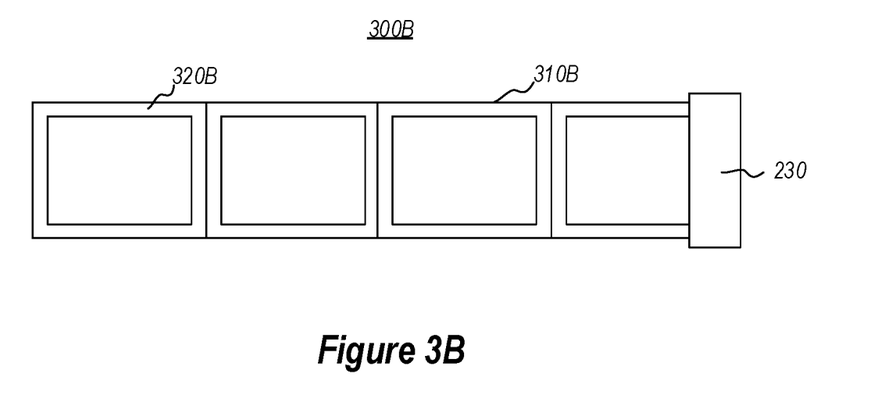
Figure 3C:
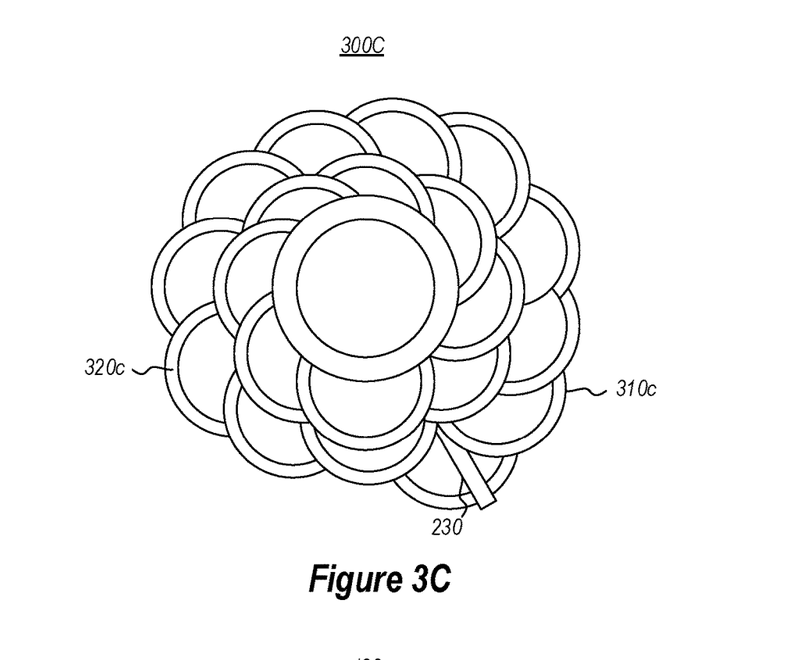

FIGS. 3A, 3B, and 3C illustrate three different specific examples of shapes that may be utilized to create a continuously growing physical structure. As shown in FIG. 3A, a nautilus-like shape may be determined to be an optimal shape for a continuously growing physical structure 310A on a particular site 300A. As shown from a top view, in such an example, the structure manufacturing system 230 (e.g., a 3D printer) may ride along a track, or rail, while creating walls for the physical structure. Furthermore, the space 320A between walls may allow for power delivery (e.g., via wires that are placed in the space 320A) and network connections. In a specific example, another structure manufacturing system 230 that is capable of laying down electrical wiring and network cables may be on the same track in front of the structure manufacturing system 230 that is creating the walls. In other embodiments, the space 320 may act as a plenum space that aids airflow within the physical structure 310A. While particular ways for creating the physical structure 310A (as well as the power delivery, network connections, airflow, and so forth) are discussed, the physical structure may be created in any number of ways (along with the power delivery, network connections, airflow, and so forth).

FIGS. 3B and 3C illustrate a top view of a second and third example of shapes that may be used to create a continuously growing physical structure. More particularly, FIG. 3B illustrates a physical structure 310B that comprise a series of rectangular spaces that are each created in turn by the structure manufacturing system 230, while FIG. 3C illustrates a physical structure 310C that comprises a series of semi-circle shapes (i.e., petals) that are each created after an initial circle is created by the structure manufacturing system. Again, the structure manufacturing system 230 in both FIG. 3B and FIG. 3C may comprise a 3D printer. For instance, in FIG. 3B, the 3D printer may be on a track that allows the printer to continually create the rectangular spaces of the physical structure 310B in linear fashion. In another example, in FIG. 3C, the 3D printer may include both a track and an adjustable arm that is capable of creating circles (or semi-circles).

Space 320B and space 320C may allow for power delivery (e.g., via wires that are placed in the space 320B and the space 320C), as well as network connections for structure 310B and structure 310C, respectively. In a specific example, another portion of the structure manufacturing system may be capable of laying down electrical wiring and network cables immediately previous to the structure manufacturing system 230 creating the walls. While the space 230A, space 230B, and the space 230C are discussed as comprising spaces between walls of the physical structure, the space 230A, space 230B, and the space 230C may each comprise a thickness of walls of the physical structure instead. Notably, while three specific example shapes are illustrated herein, these shapes are only shown for illustrative purposes and are not meant to limit the principles described herein. Accordingly, any number of different shapes/sizes and any number of ways of creating airflow, delivering power, and supplying network connections may fall within the principles described herein.

Returning to FIG. 2, the structure analytics computer system may also include maintenance engine 220. The maintenance engine 220 may be configured to continually monitor the metrics/data (as provided by the land analytics engine, the context engine, and so forth) associated with the physical structure. In particular, the maintenance engine may analyze the metrics/data to determine an optimal current growth rate for use by the structure manufacturing system in continually expanding the physical structure.

Accordingly, once the structure manufacturing system has begun creating the physical structure, the maintenance engine may continually monitor all relevant data (e.g., current business models, data associated with a current climate of the site, and so forth) to determine whether a change in growth rate would be optimal. As growth rate changes are determined by the maintenance engine, those changes are communicated to the structure manufacturing system such that the structure manufacturing system can modify the actual continuous growth/creation of the physical structure in accordance with the determined growth rate changes. As such, the growth rate may be continuously changing, such that, at times the growth rate is relatively high, while at other times, the growth rate is relatively low (or potentially dormant for periods of time).

In some embodiments, the maintenance engine may determine that multiple continuously growing physical structures would be optimal on a particular site rather than a single physical structure. In such embodiments, the structure analytics computer system and/or the maintenance engine may determine that the multiple physical structures are to be created at the same time, or that a single physical structure is to be built until the single physical structure reaches a particular size, at which time a second physical structure may be created near the first physical structure (and so on). In other embodiments, the maintenance engine may analyze all relevant metrics/data provided to determine that while the structure manufacturing system has been creating a physical structure in a first, particular shape, that based on the metrics/data (e.g., changes in climate, changes in business models, changes in context of the physical structure), a second, particular shape should be used for all additional growth of the physical structure moving forward. Accordingly, optimizations associated with the physical structure may be continuously analyzed and determined.

The maintenance engine may also be responsible for determining when certain components (e.g., servers, batteries, wires, walls of the physical structure, and so forth) have become obsolete or are in need of repair/replacement. In such circumstances, the structure analytics computer system may communicate with the maintenance system 240A to dispose of components (i.e., in the case of obsolescence) or to repair/replace components when possible. Notably, various types of robots may be utilized in maintenance of the physical structure (and may logically be included as part of the maintenance system. For instance, one or more robots that comprise at least a portion of the maintenance system may perform disposal, repair, and/or replacement of components (e.g., servers) of a continuously growing physical structure.

In a more specific example, the structure manufacturing system may create walls of the physical structure that act as racks (or allow for stacking servers vertically, as appropriate). In such instances, the maintenance system may include one or more robots that are configured to retrieve servers and place the servers in place on the wall. In another example, the structure manufacturing system may create a loading dock for receiving components/materials (e.g., servers, server parts, fans, electrical wires, network wires, antennas, and so forth). In such circumstances, an automated delivery truck may deliver components to the loading dock which can be received by maintenance system robots that are capable of retrieving the components from the truck. Such robots may be further capable of then using the components in repair or replacement of other components (i.e., disposing of an old server, fixing a failing server, replacing a failing server, and so forth). Accordingly, as discussed, while shown as being only one component, the maintenance system may comprise numerous components (e.g., robots) configured to maintain a continuously growing physical structure, as further described herein.

In some embodiments, manufacturing of all, or nearly all, components (e.g., servers) may be performed at a manufacturing facility on-site. Most, or all components, may then be retrieved by robots that are capable of installing the components at the physical structure. For instance, the structure manufacturing system may create generic attach points that are embedded into walls of the physical structure for easily connecting components (e.g., servers) at the physical structure (e.g., by utilizing robots). In other embodiments, components (e.g., replacement components) may be delivered by automated vehicles. In such embodiments, robots (i.e., the management computer system 240) may also retrieve the components from the automated vehicle and install the components at the physical structure. Accordingly, human interaction may be largely, or in some circumstances, entirely, avoided.

Notably, in some embodiments, the environment 200 may be utilized in circumstances when a physical structure is already present (i.e., a physical structure that was not created by the structure analytics computer system and the structure manufacturing system). In such embodiments, the structure analytics computer system, the structure manufacturing system, and the maintenance system may be capable of identifying and analyzing metrics associated with the already created physical structure, and further be capable of generating growth of the already created physical structure. In particular, the additive manufacturing engine 232 may be primarily responsible for generating continuous growth of such an already existing physical structure. Alternatively, the structure analytics computer system, the structure manufacturing system, and the maintenance system may be capable of creating a physical structure (and generating continuous growth of the physical structure) from scratch (i.e., in circumstances where a physical structure has yet to be created). Accordingly, the principles described herein may allow for generating continuous growth of a physical structure whether the physical structure has been built from scratch or whether growth is generated with respect to an already built structure.

Figure 4:
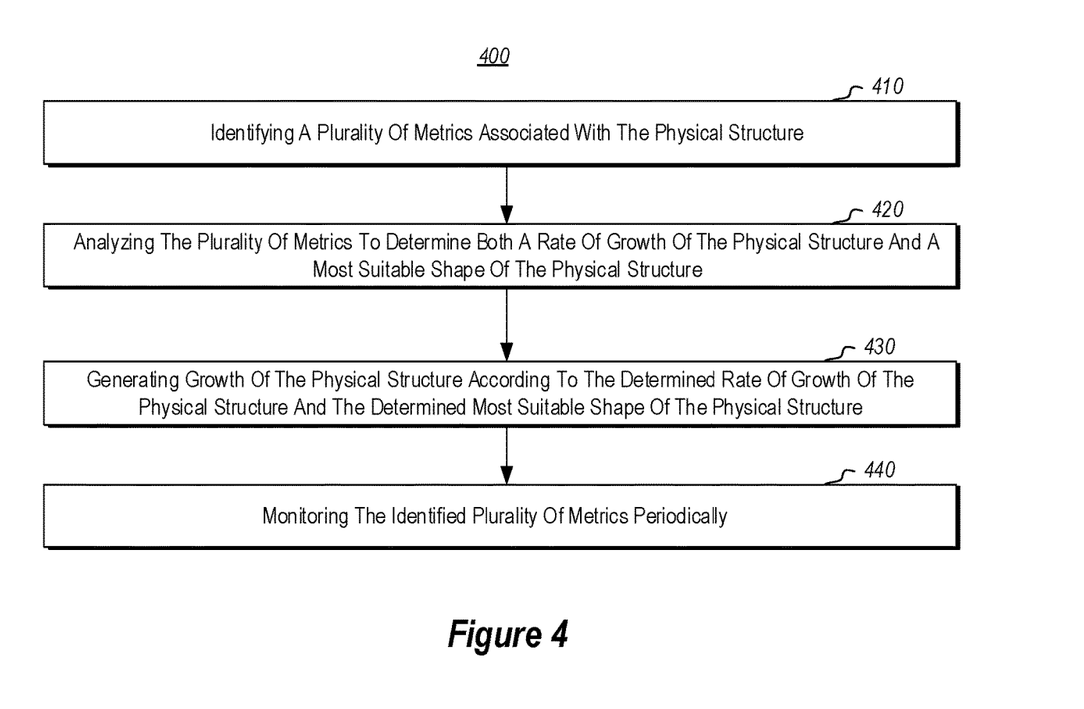
FIG. 4 illustrates a flowchart of a method for generating a continuously growing physical structure.

FIG. 4 illustrates a flowchart of a method 400 for generating a continuously growing physical structure. FIG. 4 is described with frequent reference to the environment 200 of FIG. 2. The method 400 may include identifying a plurality of metrics associated with the physical structure (Act 410). For instance, the plurality of metrics may be determined by one or more engines of the structure analytics computer system 210A, and may include at least one of a shape of available physical space, a size of available physical space, a type of soil/earth of a location of the physical structure, a context of use of the physical structure, a climate of the location, or availability of resources associated with the location, as described further herein.

The method 400 may also include analyzing the plurality of metrics to determine at least one of a rate of growth of the physical structure or a most suitable shape of the physical structure (Act 420). For example, the structure analytics computer system may determine either or both of an optimal rate of growth of the physical structure and an optimal shape for constructing the physical structure. In a more specific example, the optimal shape may comprise one of a nautilus, a series of hexagon-shaped structures, or a series of cube-shaped structures.

The method 400 may further include generating growth of the physical structure according to at least one of the determined rate of growth of the physical structure or the determined most suitable shape of the physical structure (Act 430). For instance, the structure manufacturing system 230 may continuously communicate with the structure analytics computer system 210A to identify current plans that are to be executed by the structure manufacturing system, including continually building the physical structure at the current determined rate of growth, and according to the current determined most suitable shape.

The method 400 may further include monitoring the identified plurality of metrics periodically. For instance, the maintenance engine 226 may continuously, or periodically, analyze the metrics (e.g., a shape of available physical space, a size of available physical space, a type of soil/earth of a location of the physical structure, and so forth) identified by one or more of the engines of the structure analytics computer system 210A (e.g., the land analytics engine, the context engine, and so forth) to determine whether a change in any of the metrics has occurred. When a change in one or more of the metrics has occurred, the maintenance engine may further determine that a change in at least one of the rate of growth of the physical structure or the shape of the physical structure is to occur.

In this way, a continuously growing physical structure (e.g., a data center) may be generated that is similar to a living organism. Analysis of the physical structure and various metrics associated with the structure (e.g., size and shape of available land, a context for use of the physical structure, and so forth) may allow for optimized, efficient use of space (i.e., via the determined shape of the physical structure), optimized use of resources (i.e., via the materials determined to be used in creating the physical structure), automatically generated growth of the physical structure at an optimal growth rate, repair/replacement of components when appropriate, and so forth. As such, human interaction at the site may be largely avoided with respect to any aspect of growth of the physical structure, repair/replacement of components of the physical structure, or disposal of components, as growth, repair/replacement, and disposal may be handled automatically.

Although the subject matter has been described in language specific to structural features and/or methodological acts, it is to be understood that the subject matter defined in the appended claims is not necessarily limited to the described features or acts described above, or the order of the acts described above. Rather, the described features and acts are disclosed as example forms of implementing the claims.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed:

1. A computer system comprising:
   one or more processors; and
   one or more computer-readable storage devices having stored thereon computer-executable instructions that are executable by the one or more processors to cause the computer system to generate a physical structure, the computer-executable instructions including instructions that are executable to cause the computer system to perform at least the following:
   identify a plurality of metrics associated with the physical structure, wherein the plurality of metrics include a shape of available physical space of a land location where the physical structure is to be built, a size of available physical space of the land location where the physical structure is to be built, a type of soil of the land location where the physical structure is to be built, a context of use of the physical structure, a climate of the land location, and availability of resources associated with the land location;
   analyze the plurality of metrics;
   using the analysis of the plurality of metrics, determine a shape of the physical structure to be built and a rate of growth of the physical structure;
   determine steps for growth of the physical structure according to the determined rate of growth of the physical structure and the determined shape of the physical structure, the steps to be output to a manufacturing system which comprises at least one of three-dimensional (3D) printers or robots; and
   periodically monitor the identified plurality of metrics during construction of the physical structure.

2. The computer system of claim 1, wherein the determined rate of growth is not fixed.

3. The computer system of claim 1, wherein the context of use of the physical structure comprises one or more uses of the physical structure.

4. The computer system of claim 3, wherein the one or more uses of the physical structure comprises at least one of cold storage, gpu servers, or general purpose servers.

5. The computer system of claim 1, wherein the physical structure comprises a data center.

6. The computer system of claim 1, wherein the computer-executable instructions further include instructions that are executable to cause the computer system to determine a starting point for generating growth of the physical structure.

7. The computer system of claim 1, wherein analyzing the plurality of metrics further determines at least one material to be used in generating growth of the physical structure.

8. The computer system of claim 1, wherein periodically monitoring the plurality of metrics comprises at least identifying a change in any of the plurality of metrics.

9. The computer system of claim 1, wherein the computer-executable instructions further include instructions that are executable to cause the computer system to re-analyze the plurality of metrics to determine a second, different rate of growth in response to identifying a change in at least one of the plurality of metrics.

10. A method, implemented at a computer system that includes one or more processors, for generating a physical structure, comprising:
    identifying a plurality of metrics associated with the physical structure, wherein the plurality of metrics include a shape of available physical space of a land location where the physical structure is to be built, a size of available physical space of the land location where the physical structure is to be built, a type of soil of the land location where the physical structure is to be built, a context of use of the physical structure, a climate of the land location, and availability of resources associated with the land location;
    analyzing the plurality of metrics;
    using the analysis of the plurality of metrics, determine a shape of the physical structure to be built and a rate of growth of the physical structure;
    determining steps for growth of the physical structure according to the determined rate of growth of the physical structure and the determined shape of the physical structure, the steps to be output to a manufacturing system which comprises at least one of three-dimensional (3D) printers or robots; and periodically monitoring the identified plurality of metrics at least one of before or during construction of the physical structure.

11. The method of claim 10, wherein the determined rate of growth is not fixed.

12. The method of claim 10, wherein the context of use of the physical structure comprises one or more uses of the physical structure.

13. The method of claim 12, wherein the one or more uses of the physical structure comprises at least one of cold storage, gpu servers, or general purpose servers.

14. The method of claim 10, wherein the physical structure comprises a data center.

15. The method of claim 10, wherein analyzing the plurality of metrics further determines at least one material to be used in generating growth of the physical structure.

16. The method of claim 10, wherein periodically monitoring the plurality of metrics comprises at least identifying a change in any of the plurality of metrics.

17. The method of claim 16, further comprising re-analyzing the plurality of metrics to determine a second, different rate of growth in response to identifying a change in at least one of the plurality of metrics.

18. A computer program product comprising one or more hardware storage devices having stored thereon computer-executable instructions that are executable by one or more processors of a computer system to generate a physical structure, the computer-executable instructions including instructions that are executable to cause the computer system to perform at least the following:
  identify a plurality of metrics associated with the physical structure, wherein the plurality of metrics include a shape of available physical space of a land location where the physical structure is to be built, a size of available physical space of the land location where the physical structure is to be built, a type of soil of the land location where the physical structure is to be built, a context of use of the physical structure, a climate of the land location, and availability of resources associated with the land location;
  analyze the plurality of metrics;
  using the analysis of the plurality of metrics, determine a shape of the physical structure to be built and a rate of growth of the physical structure;
  determine steps for s growth of the physical structure according to the determined rate of growth of the physical structure and the determined shape of the physical structure, the steps to be output to a manufacturing system which comprises at least one of three-dimensional (3D) printers or robots; and
  periodically monitor the identified plurality of metrics during construction of the physical structure.

19. The computer program product of claim 18, wherein the determined rate of growth is not fixed.

* * * * *